US011367328B2

(12) United States Patent
Kotani et al.

(10) Patent No.: US 11,367,328 B2
(45) Date of Patent: Jun. 21, 2022

(54) PROGRAM, TERMINAL, GAMING SYSTEM, AND GAME MANAGEMENT DEVICE

(71) Applicant: BANDAI CO., LTD., Tokyo (JP)

(72) Inventors: Hideto Kotani, Tokyo (JP); Nao Yamaguchi, Tokyo (JP); Masahiko Saito, Tokyo (JP); Hyunsoo Lee, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 8 days.

(21) Appl. No.: 16/998,821

(22) Filed: Aug. 20, 2020

(65) Prior Publication Data

US 2021/0056816 A1 Feb. 25, 2021

(30) Foreign Application Priority Data

Aug. 20, 2019 (JP) ............................ JP2019-150685

(51) Int. Cl.
*A63F 13/00* (2014.01)
*G07F 17/32* (2006.01)

(52) U.S. Cl.
CPC ...... *G07F 17/3293* (2013.01); *G07F 17/3209* (2013.01); *G07F 17/3213* (2013.01); *G07F 17/3251* (2013.01)

(58) Field of Classification Search
None
See application file for complete search history.

(56) References Cited

U.S. PATENT DOCUMENTS

| | | | | |
|---|---|---|---|---|
| 6,736,724 B1 * | 5/2004 | Erikawa | A63F 13/10 | 463/7 |
| 7,637,815 B2 * | 12/2009 | Matsuhara | A63F 13/10 | 463/43 |
| 9,586,134 B2 * | 3/2017 | Tsukioka | A63F 13/10 | |
| 2007/0173333 A1 * | 7/2007 | Matsuhara | A63F 13/822 | 463/43 |
| 2013/0120569 A1 * | 5/2013 | Mizuta | A63F 13/5255 | 348/143 |
| 2014/0243089 A1 * | 8/2014 | Tsukioka | A63F 13/35 | 463/31 |

FOREIGN PATENT DOCUMENTS

| | | |
|---|---|---|
| JP | 2011-229898 A | 11/2011 |
| JP | 2014-184081 A | 10/2014 |
| JP | 2017-202045 A | 11/2017 |

OTHER PUBLICATIONS

JP Patent Application 2019-150685 1st Office Action dated Mar. 25, 2020.

(Continued)

*Primary Examiner* — Sunit Pandya
(74) *Attorney, Agent, or Firm* — Alston & Bird LLP

(57) ABSTRACT

Provided is a game with enhanced entertainment properties to users. A program that causes a computer to execute the game using a first game element causes the computer to function as selecting means and output control means. The selecting means selects the first game element associated with a player. The first game element is converted from a first expression mode to a second expression mode when a predetermined condition is satisfied. The output control means outputs the selected first game element in accordance with the second expression mode.

18 Claims, 21 Drawing Sheets

(56) References Cited

OTHER PUBLICATIONS

JP Patent Application 2019-150685 2nd Office Action dated Jul. 22, 2020.
The first collaboration of "Langrysser Mobile" is "The Legend of Heroes: Sky's Path!" The long-awaited "confession" function is also implemented, Famitsu App[online], Jul. 9, 2019, [Mar. 11, 2020 search], Internet URL:https://app.famitsu.com/20190709_1478088/.
V Jump Books Mixi "Official" Strategy Guide "Monster Strike" Official Victory Guide, Shueisha Co., Ltd., Oct. 26, 2014, p. 24.
Evolutionary Synthesis Explanation! GameWith)[on line], May 25, 2016, [Mar. 10, 2020 Search], Internet URL:https://gamewith.jp/kuronekowiz/article/show/3812.
New Features Shake! Move! Become your own vampire! Add a card with voice to "Vampire Blad"! "Princess Lara (CV. Kanae Ito)" appears!, Anibu News [online], May 1, 2019 Sun, [Mar. 1, 2020 m day search], internet URL:https://news.anibu.jp/20190501-120952.html.
Strike Evaluation, Monster Strike (Monst) Strategy Summary [online], Feb. 8, 2016, [Mar. 10, 2020 Search], Internet <URL: https://wiki.famitsu.com/monsterstrike/Strike Rating>.
V Jump Books Square Enix Official Dragon Quest XI in Search of the Passing Time Rotzetasia Guide for PlayStation ▲R▼ 4, Shueisha Co., Ltd., Jul. 31, 2017, p. 42 (newly cited documents).
Se-Mook PlayStation ▲R▼ 4th Edition Dragon Quest XI In search of a passing time Official Guidebook, Square Enix Co., Ltd., Aug. 29, 2017, first edition, p. 633 (newly cited document).
The Lost Child, Dengeki PlayStation vol. 643, Kadokawa Co., Ltd., Jul. 27, 2017, vol. 23, vol. 19, vol. 773, p. 116 (Newly cited document) (Document showing well-known technology).

* cited by examiner

FIG. 10

| | |
|---|---|
| CARD IDENTIFICATION INFORMATION | 001 |
| CHARACTER NAME | AAA |
| CARD IMAGE (FIRST EXPRESSION MODE DATA) | A1 |
| RACE | BBB |
| ABILITY | FIRE |
| STRIKING POWER | 100 |
| HP | 300 |
| RARITY | 2 |
| COST VALUE | 3 |
| COLOR | RED |
| PREMIUM-UPGRADED | NO |
| SECOND EXPRESSION MODE DATA | — |
| PAID/FREE | FREE |
| ⋮ | ⋮ |

FIG. 11

| DECK 1 | |
|---|---|
| CARD IDENTIFICATION INFORMATION | 001 |
| CARD IDENTIFICATION INFORMATION | 006 |
| ⋮ | |
| CARD IDENTIFICATION INFORMATION | 023 |

FIG. 15

CARD SETTING DATA OF SELECTED CARD

| | |
|---|---|
| CARD IDENTIFICATION INFORMATION | 001 |
| CHARACTER NAME | AAA |
| CARD IMAGE | A1 |
| RACE | BBB |
| ABILITY | FIRE |
| STRIKING POWER | 100 |
| HP | 300 |
| RARITY | 2 |
| COST VALUE | 3 |
| COLOR | RED |
| PREMIUM-UPGRADED | NO |
| SECOND EXPRESSION MODE DATA | — |
| ⋮ | ⋮ |

CARD SETTING DATA OF PREMIUM CARD

| | |
|---|---|
| CARD IDENTIFICATION INFORMATION | p001 |
| CHARACTER NAME | AAA |
| CARD IMAGE | A1 |
| RACE | BBB |
| ABILITY | FIRE |
| STRIKING POWER | 100 |
| HP | 300 |
| RARITY | 2 |
| COST VALUE | 3 |
| COLOR | RED |
| PREMIUM-UPGRADED | YES |
| SECOND EXPRESSION MODE DATA | pa001.xxx |
| ⋮ | ⋮ |

GENERATE NEW PREMIUM CARD BY
USING CARD SETTING DATA OF SELECTED CARD

FIG. 18

| | |
|---|---|
| USER IDENTIFICATION INFORMATION | 1001 |
| DECK 1 | |
| CARD IDENTIFICATION INFORMATION | 001 |
| CARD IDENTIFICATION INFORMATION | 006 |
| ⋮ | |
| DECK 2 | |
| CARD IDENTIFICATION INFORMATION | 008 |
| CARD IDENTIFICATION INFORMATION | 009 |
| ⋮ | |
| OWNED CARD INFORMATION | |
| CARD IDENTIFICATION INFORMATION | 001 |
| CARD IDENTIFICATION INFORMATION | 006 |
| CARD IDENTIFICATION INFORMATION | 008 |
| CARD IDENTIFICATION INFORMATION | 009 |
| ⋮ | |
| OWNED ITEM INFORMATION | |
| ITEM IDENTIFICATION INFORMATION | I002 |
| ⋮ | |
| BALANCE INFORMATION | |
| CURRENCY A | 10000 |
| CURRENCY B | 20000 |
| ⋮ | |

FIG. 19

| RARITY | CARD | ITEM |
|---|---|---|
| 1 | 10 | 5 |
| 2 | 15 | 8 |
| 3 | 20 | 10 |
| ⋮ | ⋮ | ⋮ |

PROGRAM, TERMINAL, GAMING SYSTEM, AND GAME MANAGEMENT DEVICE

CROSS REFERENCES TO RELATED APPLICATIONS

This application claims priority to Japanese Patent Application No. 2019-150685 filed in the Japan Patent Office on Aug. 20, 2019, the entire contents of which are incorporated herein by reference.

BACKGROUND

Field of the Invention

The present invention relates to programs, terminals, gaming systems, and game management devices.

Description of the Related Art

In recent years, games that use, for example, smartphones and portable telephones as platforms are popular. An example is a game that uses decks each having a combination of game elements, such as virtual cards, and decides the win and loss in a competitive game by using parameter values of the individual game elements forming each deck.

Another example is a team-versus-team game in which a player acts as a team owner to collect contenders, and forms his/her own team from the collected contenders to compete with a team of another player. In a game of this type, the contenders are collected by collecting trading cards. These trading cards are associated with the contenders usable within the game. The player may register the trading cards on, for example, a predetermined website so as to register the corresponding contenders that can be used for forming the player's own team. For example, see Japanese Unexamined Patent Application Publication No. 2011-229898.

SUMMARY

Games that can entertain players by using game elements owned by the players are in demand.

Accordingly, it is an object of the present invention to provide a program, a terminal, a gaming system, and a game management device that can provide a game with enhanced entertainment properties to players.

An aspect of the present invention provides a program that causes a computer to execute a game using a first game element. The program causes the computer to function as selecting means and output control means. The selecting means selects the first game element associated with a player. The first game element is converted from a first expression mode to a second expression mode when a predetermined condition is satisfied. The output control means outputs the selected first game element in accordance with the second expression mode.

Another aspect of the present invention provides a terminal in which a game is performed by using a first game element. The terminal includes selecting means and output control means. The selecting means selects the first game element associated with a player. The first game element is converted from a first expression mode to a second expression mode when a predetermined condition is satisfied. The output control means outputs the selected first game element in accordance with the second expression mode.

Another aspect of the present invention provides a gaming system that performs a game using a first game element associated with a first player and a first game element associated with a second player serving as an opponent. The gaming system includes a terminal and a game management device. The terminal includes selecting means and output control means. The selecting means selects the first game element associated with the first player or the second player. The first game element is converted from a first expression mode to a second expression mode when a predetermined condition is satisfied. The output control means outputs the selected first game element in accordance with the second expression mode. The game management device includes determining means for determining a game element to be consumed for converting the expression mode of the first game element selected by the selecting means of the terminal.

Another aspect of the present invention provides a game management device communicable with a terminal of a first player and a terminal of a second player serving as an opponent for the first player. The game management device includes determining means for determining a game element to be consumed for converting an expression mode of a first game element selected in the terminal of the first player or the second player. The first game element is converted from a first expression mode to a second expression mode when a predetermined condition is satisfied.

The present invention can provide a game with enhanced entertainment properties to users.

BRIEF DESCRIPTION OF THE DRAWINGS

FIG. 10 illustrates an example of card setting data;

FIG. 11 illustrates an example of deck setting data;

FIG. 15 illustrates a process for generating card setting data of a premium card;

FIG. 18 illustrates an example of user information data;

FIG. 19 illustrates an example of required-number-for-premium-upgrade data;

DETAILED DESCRIPTION

The present disclosure now will be described more fully hereinafter with reference to the accompanying drawings in which some but not all embodiments of the disclosure are shown. Indeed, these embodiments may be embodied in many different forms and should not be construed as limited to the embodiments set forth herein; rather, these embodiments are provided so that this disclosure will satisfy applicable legal requirements.

Overall Configuration

Figure 1:
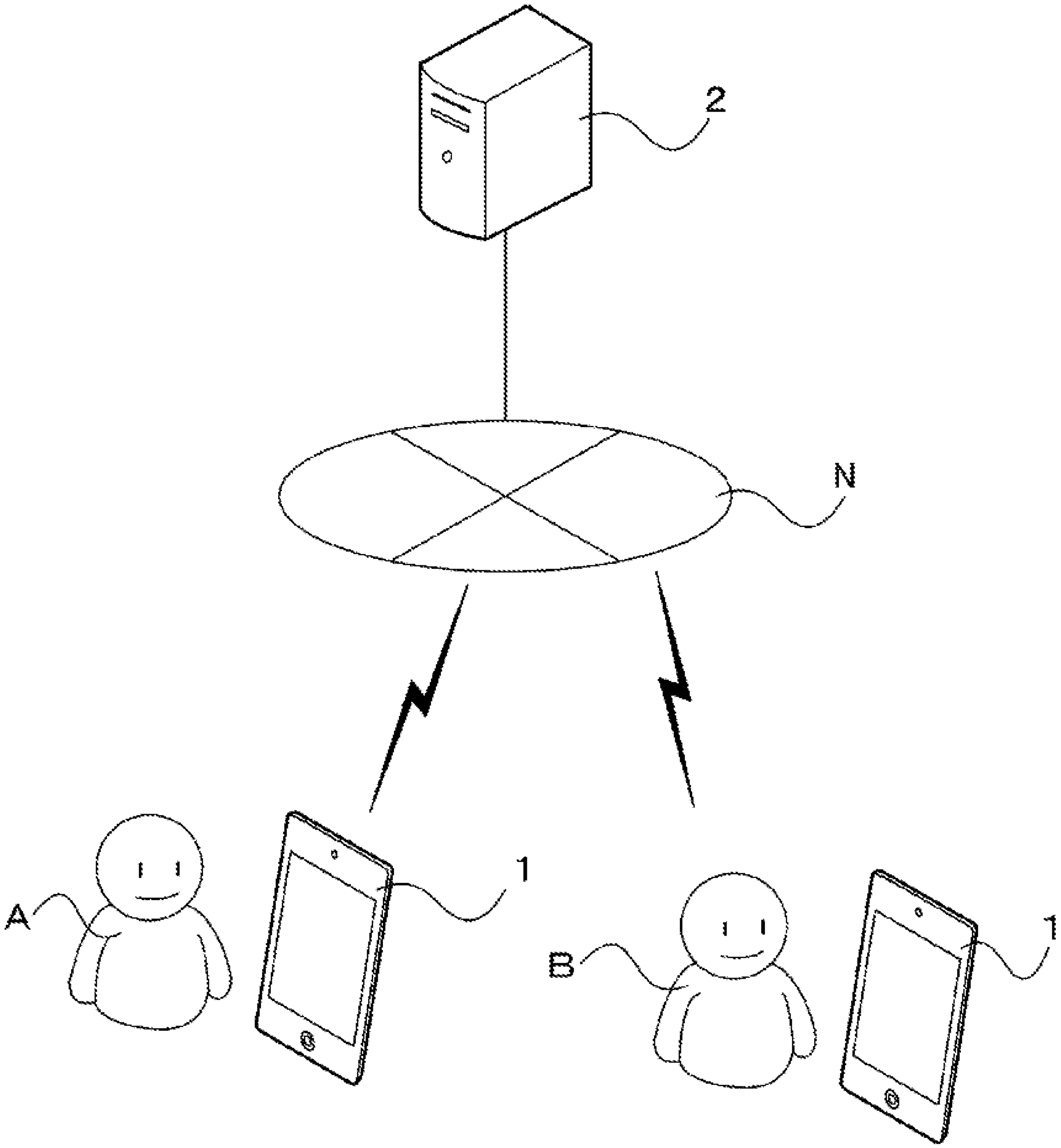
FIG. 1 illustrates an overall configuration example of a gaming system according to an embodiment.

FIG. 1 illustrates an overall configuration example of a gaming system according to an embodiment. As shown in FIG. 1, the gaming system includes player terminals 1 prepared for individual game players A and B, and also includes a game server 2. The player terminals 1 and the game server 2 are connectable to a communication line N and are communicable with each other.

The communication line N refers to a communication path through which data communication can be performed. Specifically, examples of the communication line N include a local area network (LAN) established by, for example, Ethernet (registered trademark) or a dedicated line (i.e., a dedicated cable) for direct connection, and a communication network, such as a telephone network, a cable network, or the Internet. The communication method may either be a wired method or a wireless method.

Each player terminal 1 is a computer that can execute a gaming program and connects with the communication line N via, for example, a wireless communication base station so as to perform data communication with the game server 2. Each player terminal 1 is, for example, a smartphone, a portable telephone, a portable gaming device, a stationary domestic gaming device, a commercial gaming device, a personal computer, a tablet computer, or a controller for a stationary domestic gaming device. Basically, there are a plurality of player terminals 1 that are operated by individual players.

The game server 2 is a server system including, for example, one or more server devices and a storage device. The game server 2 provides various kinds of services for operating a game according to this embodiment and can manage data required for operating the game and can distribute a gaming program and data required for executing the game in the player terminals 1.

Figure 2:
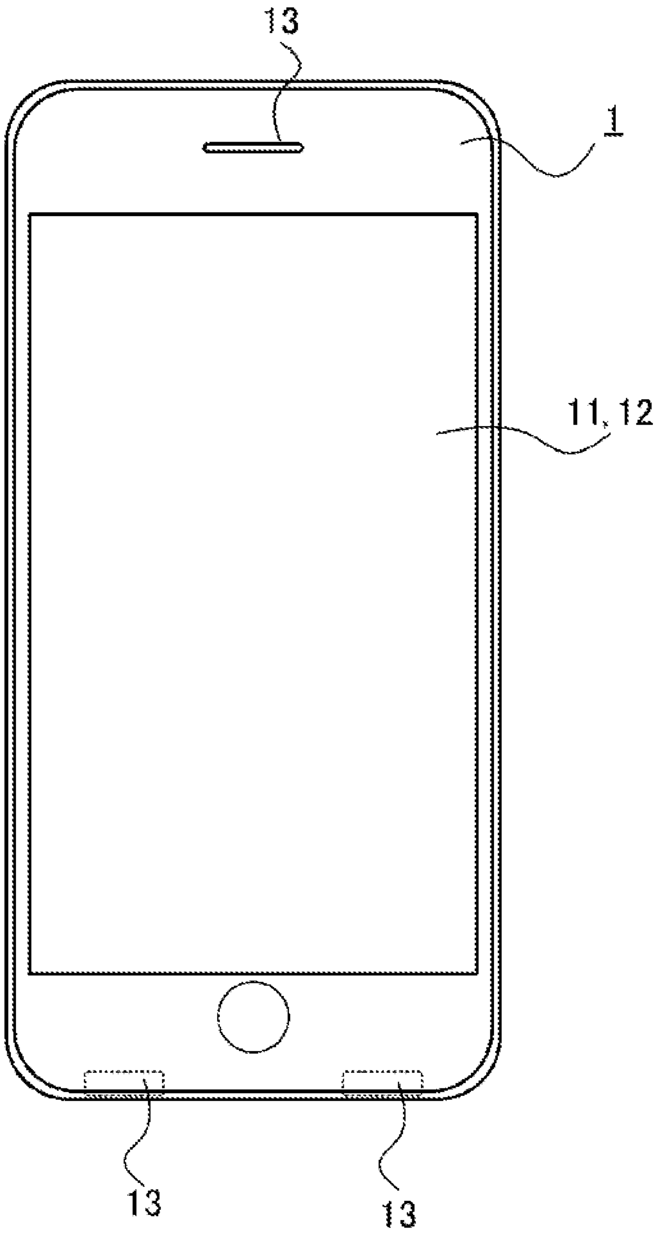
FIG. 2 illustrates a device configuration example of a smartphone serving as an example of one of player terminals.

FIG. 2 illustrates a device configuration example of a smartphone serving as an example of one of the player terminals 1. As shown in FIG. 2, the player terminal 1 includes a display 11, a touch operation panel 12 integrated with the display 11, and loudspeakers 13. The player terminal 1 is also provided with a control substrate, a built-in battery, a power button, and volume control buttons, none of which are shown.

The control substrate is equipped with various types of microprocessors, such as a central processing unit (CPU), a graphics processing unit (GPU), and a digital signal processor (DSP), various types of integrated-circuit (IC) memory units, such as an application-specific integrated circuit (ASIC), a video random access memory (VRAM), a random access memory (RAM), and a read only memory (ROM), and a wireless communication module for wirelessly communicating with a portable telephone base station. The control substrate is also equipped with a so-called interface (I/F) circuit, such as a driver circuit for the touch operation panel 12. These components equipped in the control substrate are electrically connected to one another by, for example, a bus circuit in a manner such that the components can read and write data and exchange signals with each other.

This embodiment relates to an example where the aforementioned gaming system is applied to a competition game that uses a first game element associated with the first player A and a first game element associated with the second player B as an opponent.

The first game elements are virtual or substantive articles obtained as a result of transubstantiating characters appearing in the game. Examples of a virtual or substantial article include a virtual card displayed on a computer and a substantial card. In the game to be executed, each of the characters appearing by using the cards is action-controlled based on an operation performed by a player (including a non-player operated by the computer), and each card has a design of the corresponding character (i.e., an image indicating the appearance of the character). The design of the card may also have an image of the background of the character.

In this game, the expression mode of the first game element associated with each player is converted from a first expression mode to a second expression mode when a predetermined condition is satisfied. The expression "the expression mode is converted" refers to conversion from the design of the first game element (i.e., the first expression mode) to a design (i.e., the second expression mode) different from this design (i.e., the first expression mode), and also includes conversion from a mode (i.e., the first expression mode) expressing the first game element using a still image to a mode (i.e., the second expression mode) expressing at least a part of the first game element using a moving image. If the expression mode of the first game element is a mode expressing the character and the background thereof using a still image (i.e., the first expression mode), the expression mode may be converted to a mode expressing at least one of the character and the background thereof using a moving image (i.e., the second expression mode). The second expression mode may be a mode in which sound has been added to the expression of the first game element. For example, in a case where the first game element is a virtual card displayed on a computer, the design of the character rendered on the virtual card is converted to another design of the same character. Alternatively, the design of the character rendered on the virtual card may be converted to a moving image of the same character. As another alternative, the design of the character rendered on the virtual card may be converted to a still image or a moving image of the same character with a voice and an effect sound added thereto.

Figure 3:
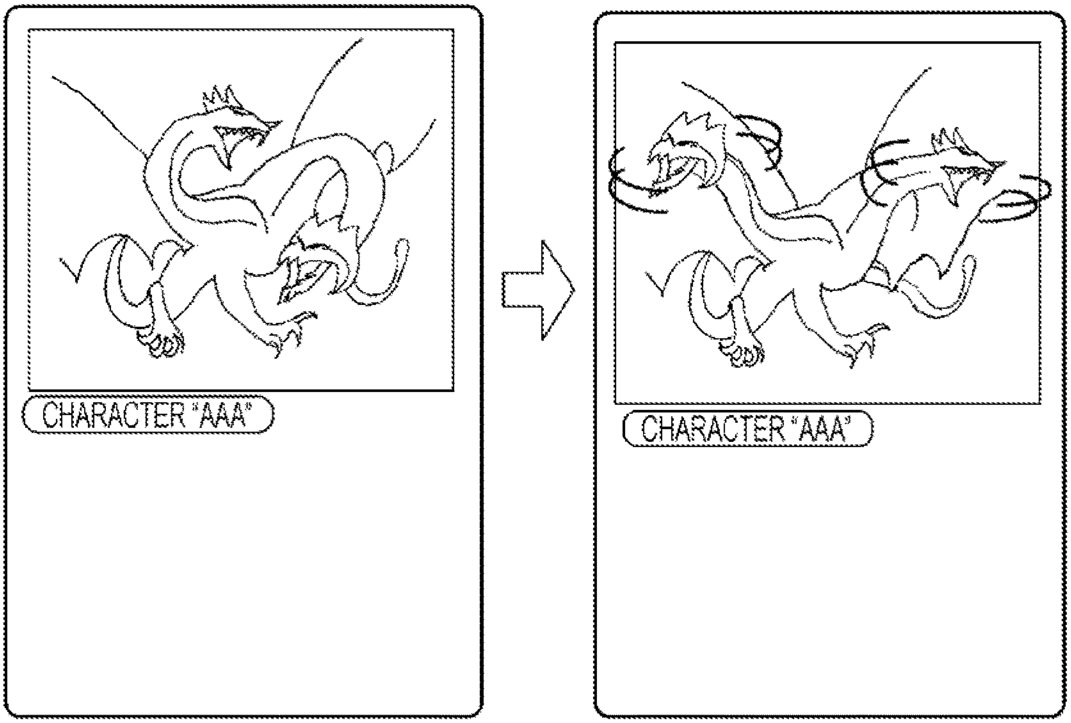
FIG. 3 illustrates an example where the design of a character rendered on a virtual card has been converted.
Figure 4:
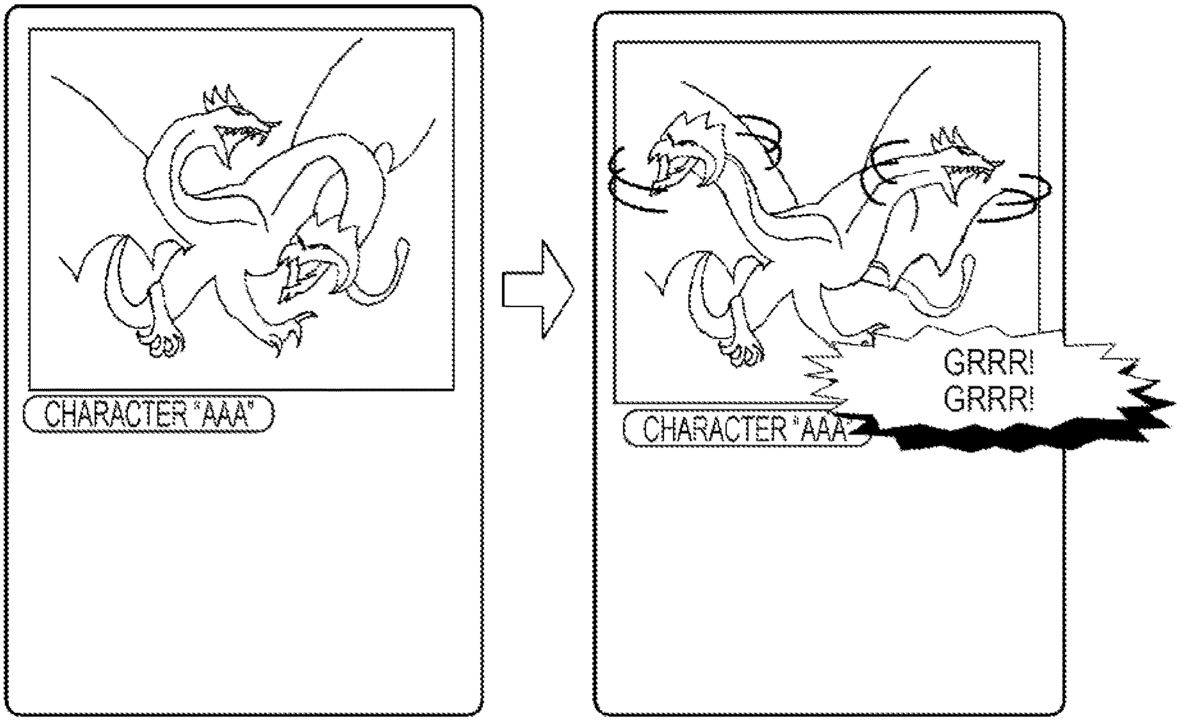
FIG. 4 illustrates an example where the design of a character rendered on a virtual card has been converted.

FIG. 3 illustrates an example where the design of a character rendered on a virtual card has been converted to a moving image of the same character. FIG. 4 illustrates an example where the design of a character rendered on a virtual card has been converted to a moving image of the same character with the character's voice added thereto.

Examples of the predetermined condition for converting the expression mode of each first game element include consumption of a first game element identical thereto or of the same type associated with the player, consumption of a predetermined item, and a payment of a predetermined fee.

A case where first game elements are identical includes a case where the first game elements have completely identical attributes. For example, in a case where the first game elements are virtual cards to be displayed on a computer, if the characters rendered on the virtual cards are identical and parameter values of the characters and other card attributes are also identical, these cards are identical.

A case where first game elements are of the same type includes a case where the characters corresponding to the first game elements are identical. If the characters are identical, any of the attributes of the first game elements other than the characters may vary. For example, in a case where the first game elements are virtual cards to be displayed on a computer, if the characters rendered on the virtual cards are identical, these cards are of the same type even if any of parameter values of the characters and card attributes varies.

A predetermined item is one of game elements acquirable by a player inside or outside the game. Examples of a fee include money, game currency, and points acquired by a player by participating in a lottery event held on the Internet.

The game elements of the game to be executed are not limited to game elements based on which characters are identifiable, and may be game elements for identifying, for example, items or activated effects. The articles are not limited to cards so long as the articles can be used for identifying the characters associated with the articles. For example, each article may be a shaped object, such as a model figure, having the appearance of the corresponding character.

In the case where the first game elements are cards, a card with its expression mode converted from the first expression mode to the second expression mode by satisfying the predetermined condition will be referred to as "premium card" in this embodiment. Moreover, the conversion of the expression mode from the first expression mode to the second expression mode will be referred to as "premium upgrade" in this embodiment.

General Overview of Game

Next, in order to facilitate the understanding of the description of this embodiment, the general overview of the game will be described by using the display screen of the display 11 of one of the player terminals 1.

In the game according to this embodiment, the players A and B use virtual game cards (i.e., first game elements obtained as a result of transubstantiating characters and simply referred to as "cards" hereinafter) as game objects in the game. A plurality of types of cards are prepared and are differentiated in accordance with the combination of, for example, abilities of the characters associated with the individual cards and card attributes. With regard to the ability of each character, for example, ability parameter values, such as the level, striking power, and hit points (HP) to be used in a competition play (i.e., battle) with an opponent, such as a computer-controlled opponent character or another player, are set. With regard to the card attributes, for example, rarity, color, and number are set.

With regard to the cards, a minimum number of cards required for the competition play (battle) at the time of account registration are provided. A card may be acquired during the game, may be acquired by being purchased as a billed item, or may be acquired under a lottery system called "gacha". In addition, a card may be acquired by obtaining a substantial game card (referred to as "real card" hereinafter) and registering the obtained real card to make the real card usable in the game. In detail, when the player A or B registers a real card, the player A or B can acquire a card of a card type associated with the real card.

Then, the player A forms a deck with a predetermined number of cards (e.g., 40 cards) among the owned cards, and enters the competition play (battle) by using the deck.

Figure 5:
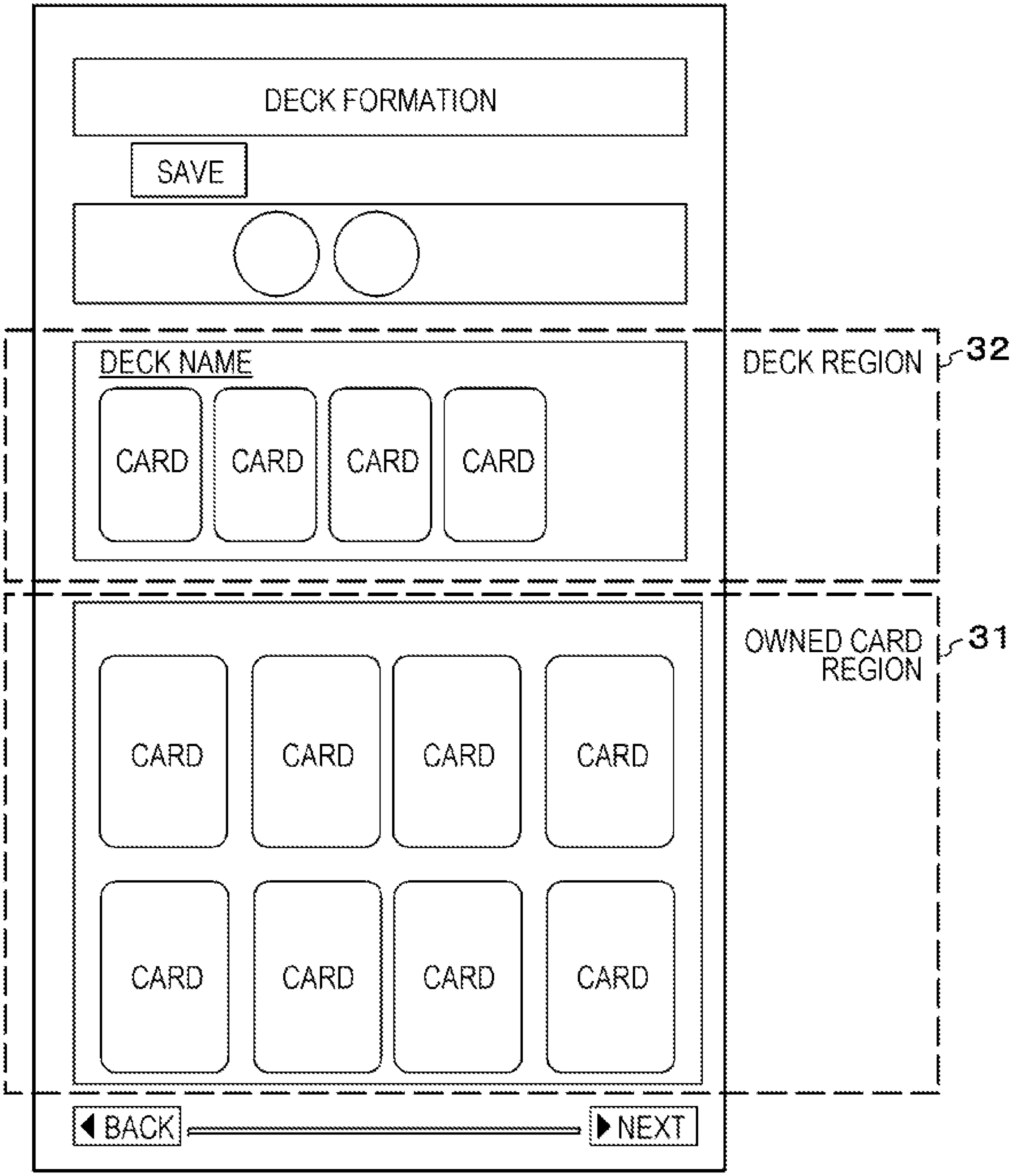
FIG. 5 illustrates an example of a deck formation screen.
Figure 6:
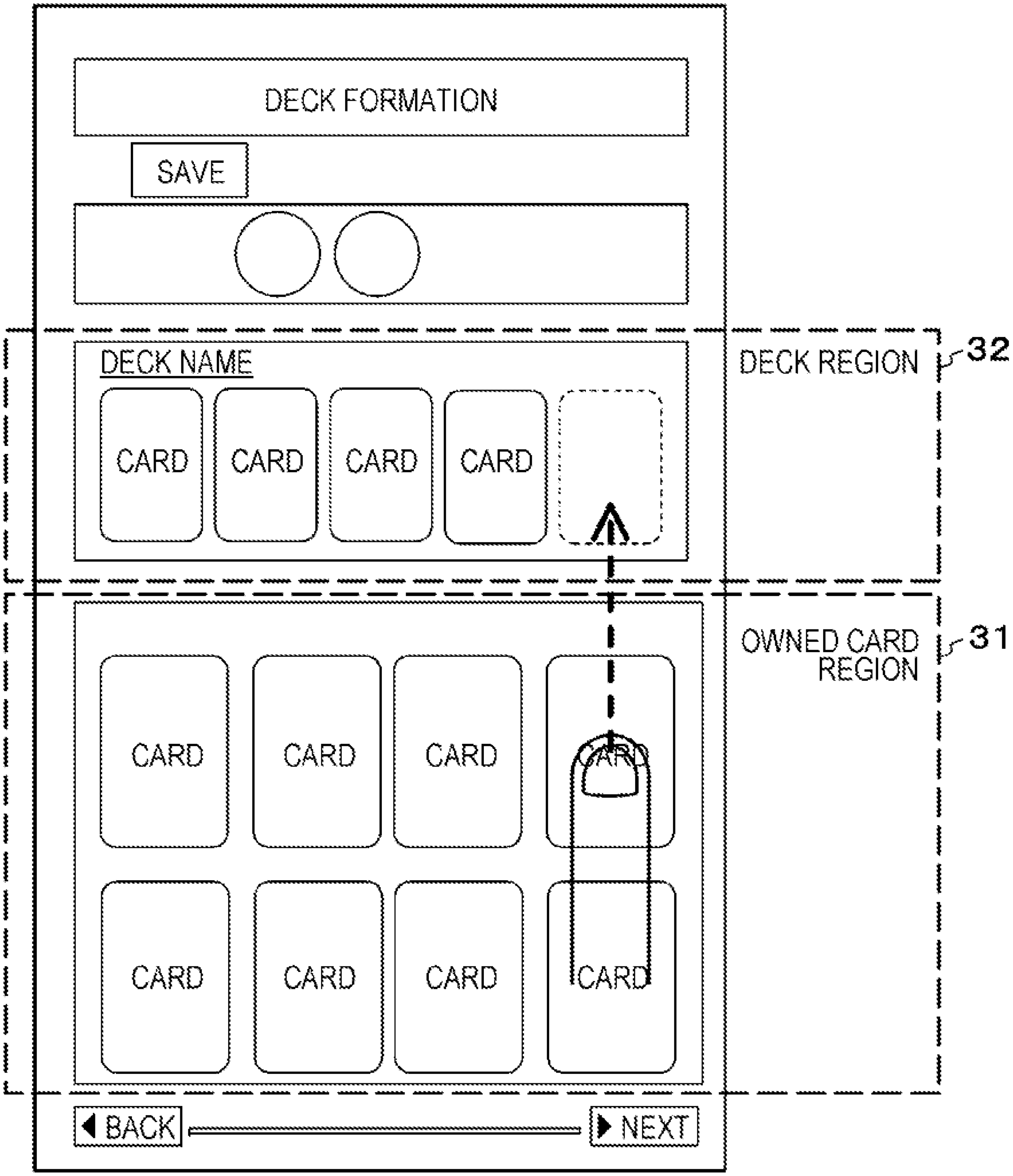
FIG. 6 illustrates an input operation performed on the deck formation screen.

A deck can be formed by, for example, touching a card menu on, for example, a home screen displayed after a player logs in and then making a selection on a deck formation menu presented as one of options in the card menu. FIG. 5 illustrates an example of a deck formation screen displayed on the display 11 of one of the player terminals 1. The deck formation screen includes an owned card region 31 where cards owned by the player are displayed and a deck region 32 where cards forming the deck are displayed. As shown in FIG. 6, while using a finger to touch a card to be included in the deck among the cards displayed in the owned card region 31, the player slides the card into the deck region 32, whereby an image of the selected card is displayed in the deck region 32. In contrast, while using a finger to touch a card displayed in the deck region 32, the player slides the card into the owned card region 31, whereby the card can be removed from the deck. The player forms a desired deck in this manner. On the deck formation screen, a premium card can also be created by using a card owned by the player. A detailed description of how a premium card is created will be provided later.

The competition play (battle) using the deck involves determining whether the player has won or lost against the opponent by using the ability parameter values of the characters set in the cards forming the deck (i.e., deck cards) and the set values of the card attributes. The battle commences when a battle menu is selected (i.e., touched) from the home screen displayed after log-in.

The battle is executed between the first player A and the second player B, as an opponent, alternately taking turns. Each turn includes a plurality of phases, namely, a standby phase for setting a hand card in a player region, such as a field, of the player from the deck cards, a card preparation phase for preparing, for example, another deck card for using the set deck cards, and a battle phase for attacking the opponent player or a card of the opponent player by using the deck cards set in the player region.

Figure 7:
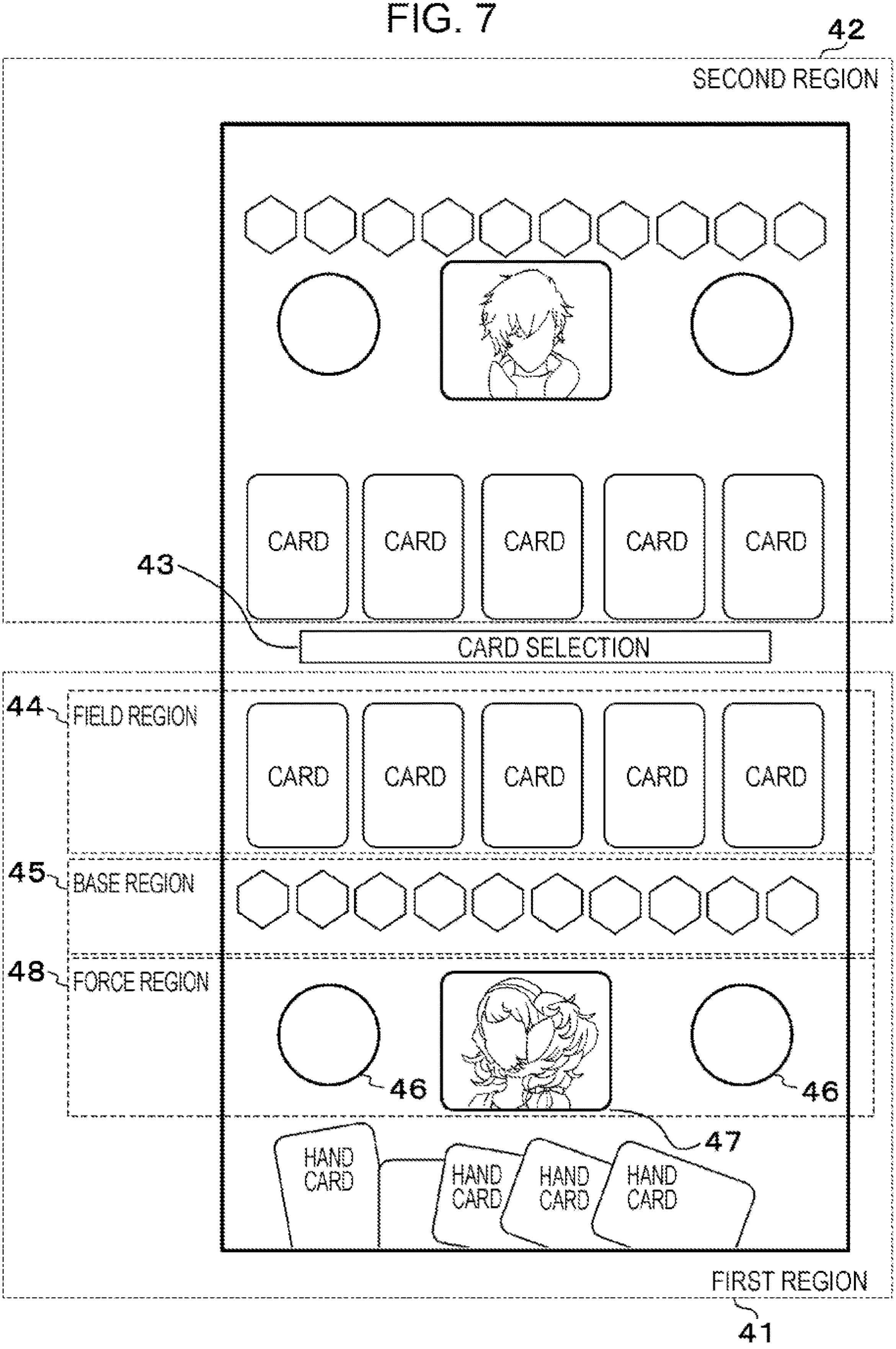
FIG. 7 illustrates an example of a display screen in a standby phase or a card preparation phase of a competition game displayed on a display of one of the player terminals.

FIG. 7 illustrates an example of a display screen in the standby phase or the card preparation phase of the competition game displayed on the display 11 of one of the player terminals 1. The screen of the display 11 includes a first region 41 where, for example, the cards of the player A are set and a second region 42 where, for example, the cards of the opponent player B are set. Furthermore, operational information 43 displaying information about a currently-executable operation is displayed at the boundary between the first region 41 and the second region 42.

Each of the first region 41 and the second region 42 includes a field region 44 where five cards (hand cards) selected from the player's own deck are disposed, a base region 45 where cards to be consumed for activating actions or effects of the cards disposed in the field are disposed, and a force region 48 where first objects 46 and a second object 47 are disposed. Each first object 46 has an effect (i.e., force) on the card activation effects and has a life (HP). The second object 47 similarly has a life (HP).

Figure 8:
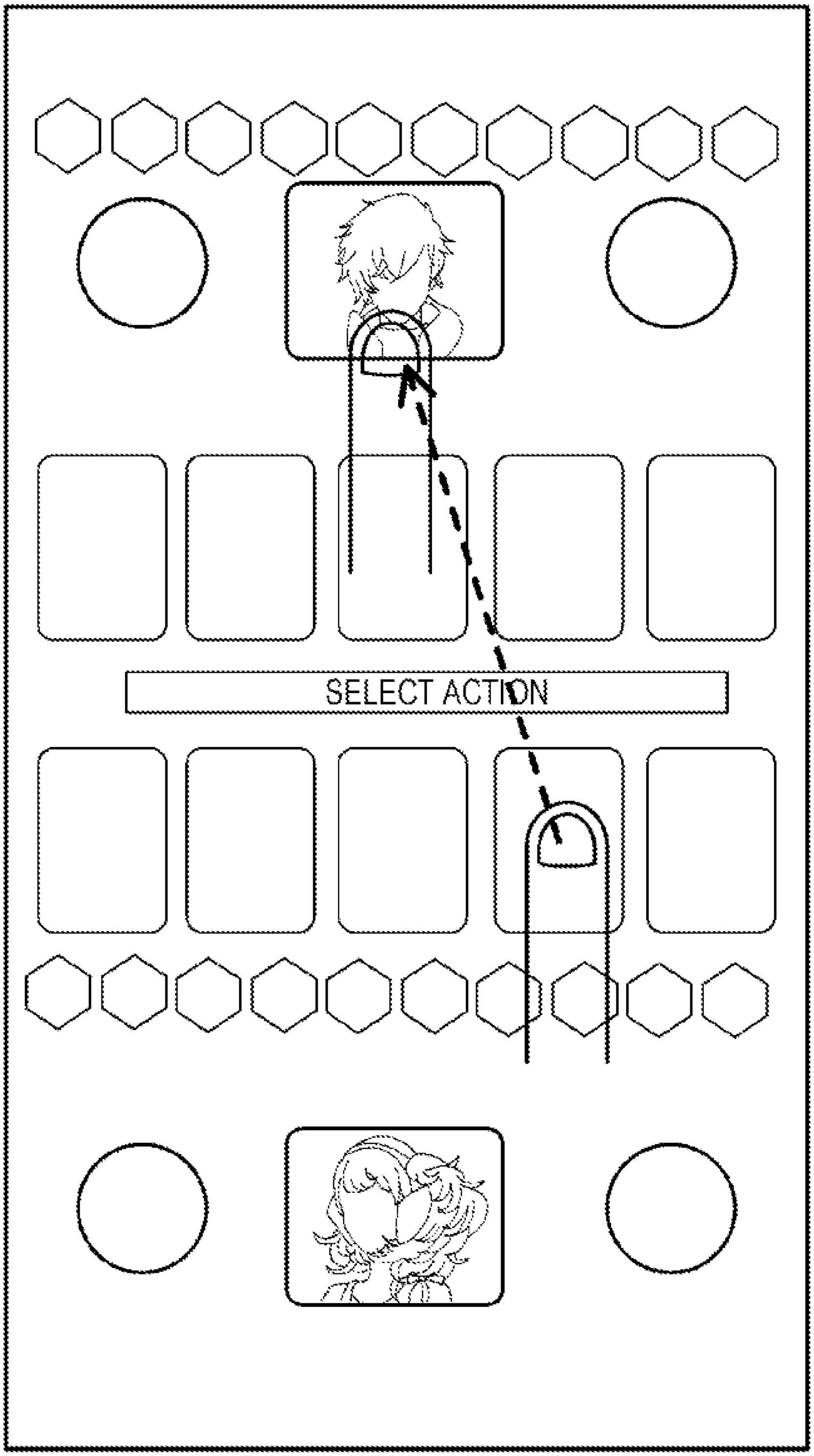
FIG. 8 illustrates an input operation performed in a battle phase.

As shown in FIG. 8, in the battle phase, the player A touches, with a finger, a card to be used for an attack and drags an opponent's card to be attacked to the first or second object 46 or 47, whereby the card used for the attack, the attacked card of the opponent player B, and the first or second object 46 or 47 are set. Accordingly, the attack of the player A commences. In this case, if the card used for the attack is a premium card, at least a part of the design of the card is displayed as a moving image, or the sound is reproduced.

The player A and the opponent player B alternately takes these turns, each having such a series of phases, until the life of either one of the players reaches zero or the number of deck cards reaches zero, whereby the win and loss of the players are decided.

Functional Configuration

Figure 9:
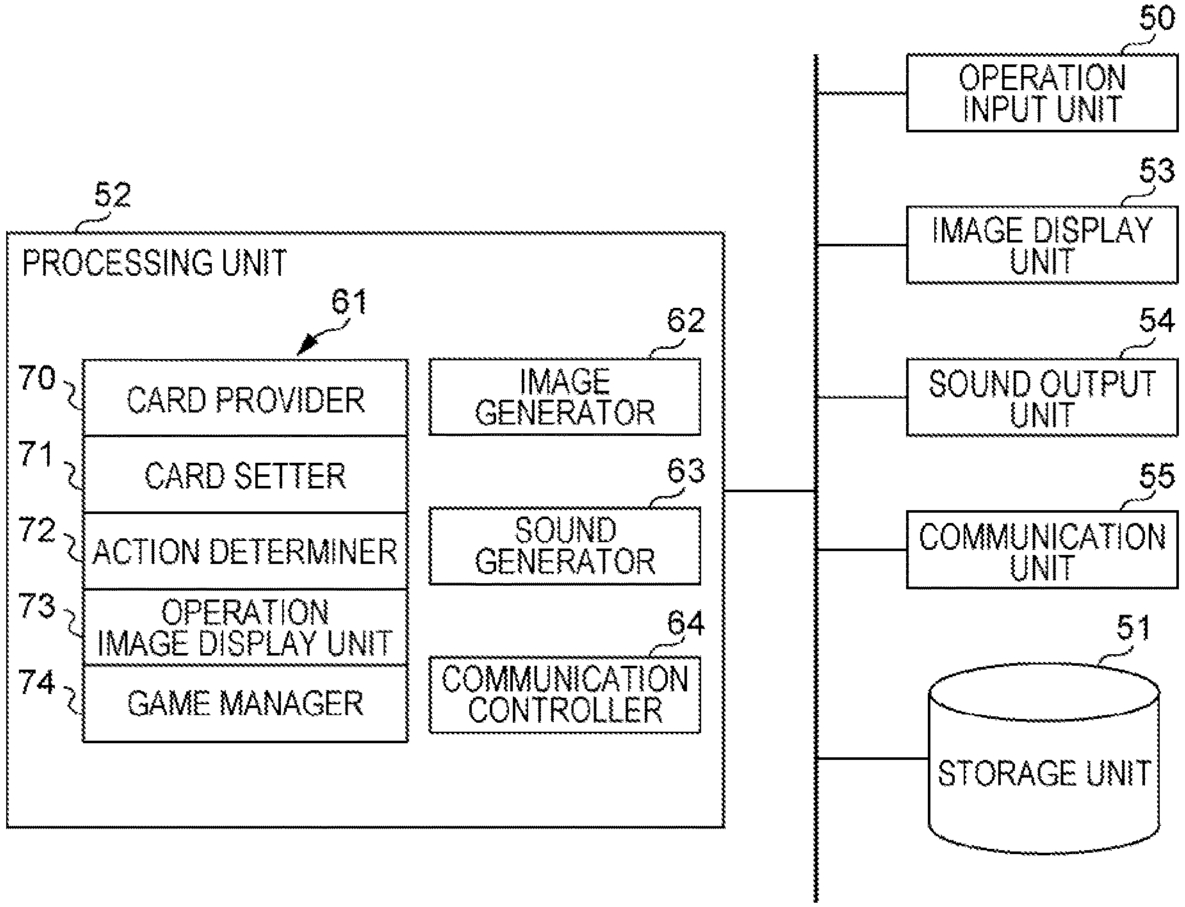
FIG. 9 is a block diagram illustrating a functional configuration example of each player terminal.

FIG. 9 is a block diagram illustrating a functional configuration example of each player terminal 1.

As shown in FIG. 9, the player terminal 1 includes an operation input unit 50, a storage unit 51, a processing unit 52, an image display unit 53, a sound output unit 54, and a communication unit 55.

The operation input unit 50 is used by the corresponding player for inputting various types of operations related to the game, and outputs an operation input signal according to an input operation to the processing unit 52. The function of the operation input unit 50 can be realized by, for example, a device manually operable directly by the player, such as a touch operation pad, a home button, a button switch, a joystick, or a trackball, or a movement or position detecting device, such as an acceleration sensor, an angular velocity sensor, a tilt sensor, or a geomagnetic sensor. In FIG. 2, the touch operation panel 12 corresponds to this function.

The storage unit 51 has preliminarily stored therein a program for activating the player terminal 1 and realizing various functions of the player terminal 1 as well as data to be used when this program is being executed, or temporarily stores such a program and data every time a process is performed. The storage unit 51 can be realized by, for example, an IC memory, such as a RAM, a ROM, or a flash memory, a magnetic disk, such as a hard disk, or an optical disk, such as a CD-ROM or a DVD.

The storage unit 51 has stored therein a system program and a gaming program. The system program is for realizing a basic function of the player terminal 1 as a computer. The gaming program is for causing the processing unit 52 to function as a game arithmetic unit 61. This gaming program is distributed to the game server 2 or another application distribution server when the player completes an account registration process.

The storage unit 51 also has stored therein card setting data and deck setting data. In addition, for example, data of items owned by the player, moving image data, still image data, and sound data (second expression mode data) for premium cards corresponding to cards owned by the player, model data and texture data for displaying an image of a game element, motion data, effect data, a background image of the game screen, and sound data, such as an effect sound, are distributed as data required for the game, where appropriate, and are stored in the storage unit 51. Moreover, the storage unit 51 has stored therein information that associates a file name of second expression mode data of each premium card with card identification information of the original card before being premium-upgraded.

The card setting data is prepared for each card owned by the player and contains information related to the ability of the character on the card and card attributes. FIG. 10 illustrates an example of the card setting data of a card owned by the player. The card setting data shown in FIG. 10 corresponds to a single card identified based on card identification information "001". The card setting data contains card identification information, character name, card image, race, ability, striking power, hit points, rarity, cost value, color, information indicating whether or not the card has been premium-upgraded (i.e., whether or not the card is a premium card), second expression mode data (moving image data, still image data, and sound data used when the card is a premium card), and information indicating whether the card is a paid card or a free card. A paid card in this embodiment is a card provided when a payment is made using money or game currency. Cards other than paid cards are free cards. Of paid cards and free cards provided to the player, only paid cards can be used for a premium upgrade. Free cards are not counted as consumption targets that can be used for a premium upgrade. Alternatively, free cards may be set as consumption targets that can be used for a premium upgrade. It should be noted that the card setting data shown in FIG. 10 is an example and is not limited to this example. The card setting data increases or decreases in number in accordance with an increase or decrease in the number of cards owned by the player.

The deck setting data relates to each deck of the player and contains card identification information of each of the cards forming the deck. FIG. 11 illustrates an example of the deck setting data. The example in FIG. 11 is an example of the deck setting data of a deck 1 of the player A and indicates that the deck 1 is formed of cards with card identification information "001" to card identification information "023". It should be noted that the deck setting data shown in FIG. 11 is an example and is not limited to this example.

The processing unit 52 comprehensively controls the operation of the player terminal 1 based on, for example, the programs and data stored in the storage unit 51 and the operation input signal from the operation input unit 50. For example, the function of the processing unit 52 can be realized by a microprocessor, such as a CPU and a GPU, and an electronic component, such as an ASIC or an IC memory. As main functional units, the processing unit 52 includes the game arithmetic unit 61, an image generator 62, a sound generator 63, and a communication controller 64.

The game arithmetic unit 61 executes various gaming processes for realizing the game according to this embodiment and outputs the processing results to the image generator 62 and the sound generator 63. The game arithmetic unit 61 includes a card provider 70, a card setter 71, an action determiner 72, an operation image display unit 73, and a game manager 74.

The card provider 70 performs a process related to provision of a card. A card is provided to the player when a predetermined condition is satisfied. Examples of the predetermined condition include a payment of a fee (such as money, game currency, or points acquired by the player by participating in a lottery event held on the Internet), an exchange with a value obtained with respect to an action of the player inside or outside the game, and registration of a user account. The card provider 70 transmits a card provision request to the game server 2, receives card data (such as card setting data), transmitted from the game server 2 when a card provision condition is satisfied, from the game server 2 via the communication unit 55, and adds the card data to the card setting data in the storage unit 51. The card data received from the game server 2 also contains second expression mode data of a corresponding premium card.

The card setter 71 manages the cards owned by the player. Furthermore, the card setter 71 manages the cards forming each deck and sets cards and hand cards set in the individual fields in the standby phase and the card preparation phase in accordance with a deck selected by the player. Moreover, the card setter 71 generates information (i.e., card setting information) related to the cards and hand cards to be set in the individual fields during a battle, and transmits the information to the game server 2 via the communication unit 55.

Figure 12:
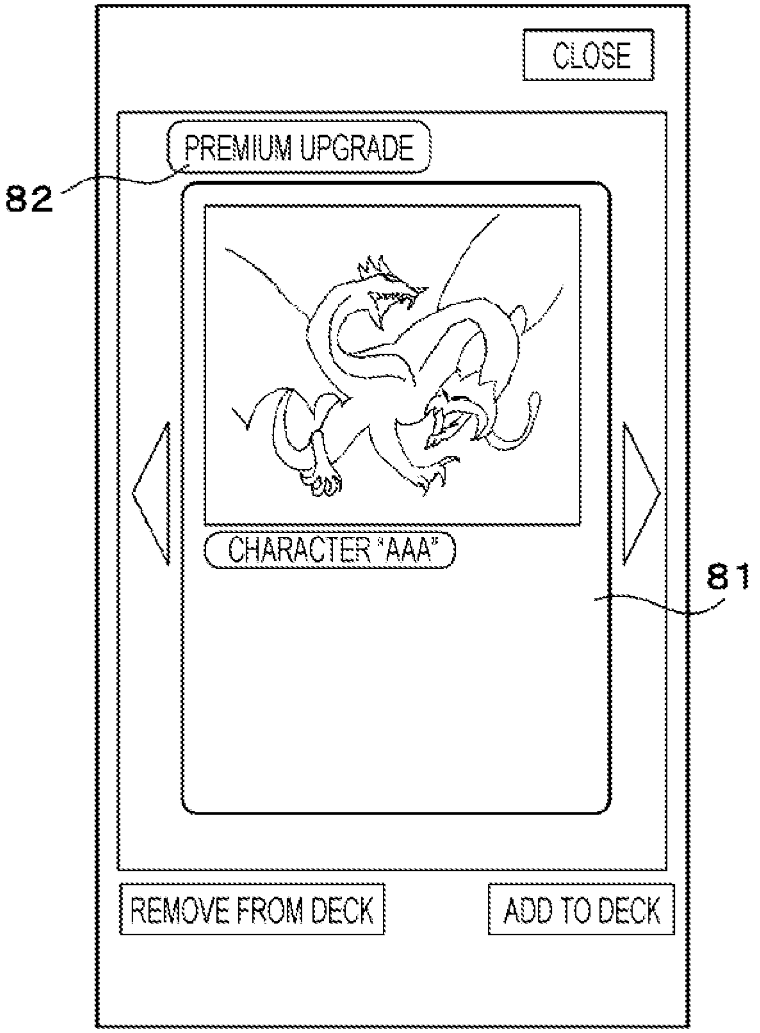
FIG. 12 illustrates an example of a card specification screen.
Figure 13:
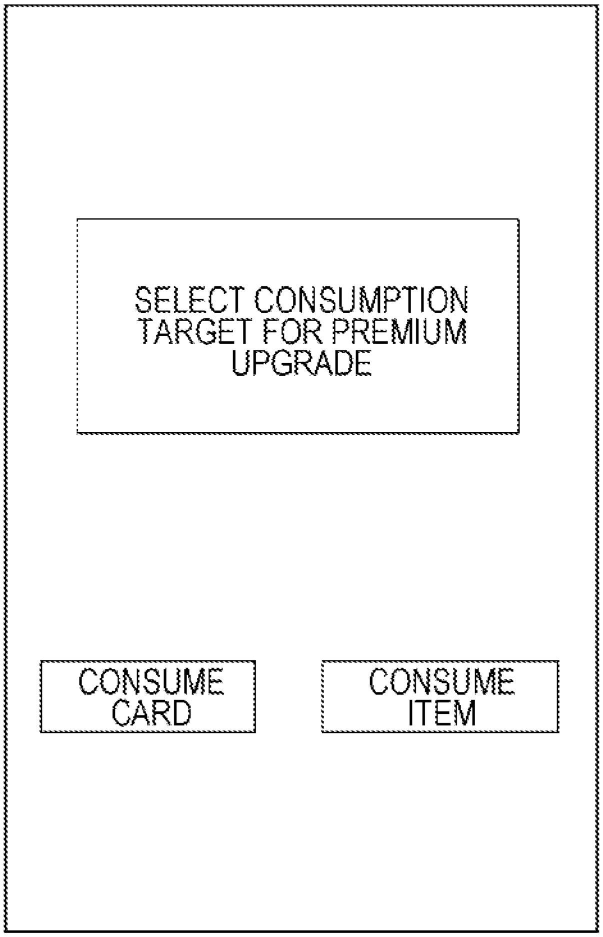
FIG. 13 illustrates an example of a consumption-target selection screen.

Furthermore, the card setter 71 generates a premium card by using a card owned by the player. When the player performs an input operation (such as a long-press operation) to select a card to be premium-upgraded from among the cards displayed in the owned card region 31 on the deck formation screen (FIG. 5), the card setter 71 displays a card specification screen with respect to the selected card. FIG. 12 illustrates an example of the card specification screen. The card specification screen includes a card region 81 where an image of the card selected by the player is displayed, and also includes a premium upgrade button 82 for generating a premium card. When the premium upgrade button 82 is pressed, the card setter 71 displays a consumption-target selection screen for allowing the player to select a target to be consumed for generating a premium card. FIG. 13 illustrates an example of the consumption-target selection screen. On the consumption-target selection screen in FIG. 13, an input for selecting either a card or an item as a consumption target is received. When a consumption target is selected, the card setter 71 transmits the card selected as a target to be premium-upgraded and information indicating the selected consumption target and the user identification information of the player together with a predetermined determination request to the game server 2 via the communication unit 55, and receives a determination result transmitted from the game server 2. The determination request is for requesting the game server 2 to check whether the player owns the consumption target required for generating a premium card. The card setter 71 uses the received determination result to display a screen indicating whether the consumption target is sufficient or insufficient. For example, in a case where a card is selected as the consumption target, FIG. 14A illustrates a screen (i.e., a confirmation screen) displayed when the consumption target is sufficient, and FIG. 14B illustrates a screen displayed when the consumption target is insufficient.

Figure 14A:
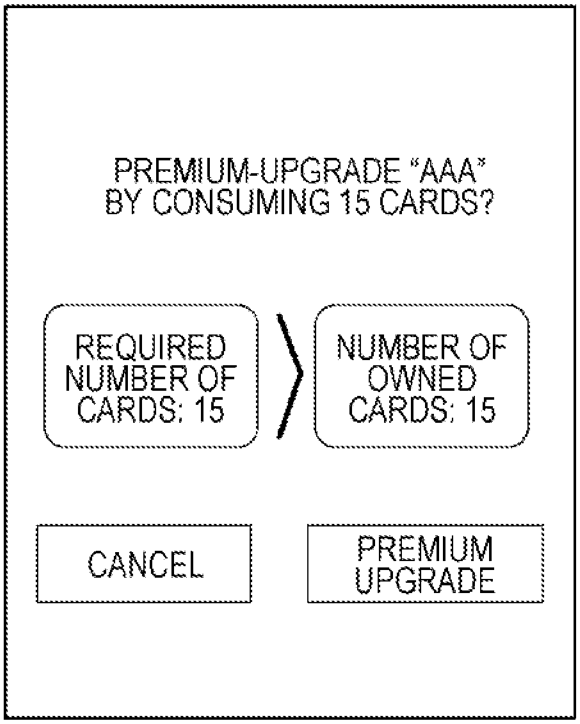
FIGS. 14A and 14B each illustrate an example of a screen indicating whether consumption targets are sufficient or insufficient.
Figure 14B:
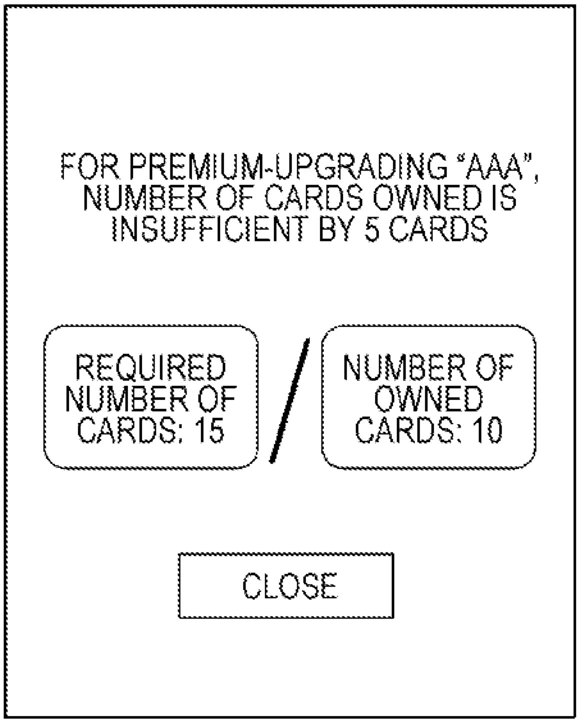

On the confirmation screen in FIG. 14A, the number of cards required for premium-upgrading the selected card, the number of cards owned by the player, a premium-upgrade execute button, and a cancel button are shown. The information about the number of cards required for a premium upgrade and the number of cards owned by the player may be transmitted together with the determination result from the game server 2.

When the card setter 71 detects that the execute button on the confirmation screen is pressed, the card setter 71 uses the card setting data corresponding to the selected card to generate new card setting data of a premium card. For example, as shown in FIG. 15, new card setting data of a premium card obtained as a result of changing set values for "card identification information", "premium-upgraded", and "second expression mode data" in the card setting data of the selected card is generated. In this case, the ability parameter values (such as race, ability, striking power, and HP) of the character are not changed from those in the original card setting data, such that the original values are used. The card setter 71 adds a single piece of the card setting data of the newly-generated premium card to the card setting data in the storage unit 51. Moreover, the data of the consumption target (card or item) is deleted. If the consumption target is a card, the card setting data of a card identical to or of the same type as the selected card is deleted such that the deleted card setting data equals in number to the required number of consumption targets. In detail, the card setting data of a card that has the same character name as the character name of the card selected by the player and that is a paid card is deleted such that the deleted card setting data equals in number to the required number of consumption targets. If the consumption target is an item, the data of the item is deleted such that the deleted data equals in number to the required number of consumption targets. Then, the game server 2 receives a completion notification including information indicating the generated premium card, information indicating the deleted consumption target, and user identification information. The information indicating the generated premium card may be, for example, the card setting data of the premium card, or may be card identification information in the card setting data of the original card and card identification information in the card setting data of the premium card.

The action determiner 72 determines a selection of a card or an action of a card in accordance with, for example, a touch operation of the player, generates action selection information as information about the selection or action of the card, and transmits the action selection information to the game server 2 via the communication unit 55.

Figure 16:
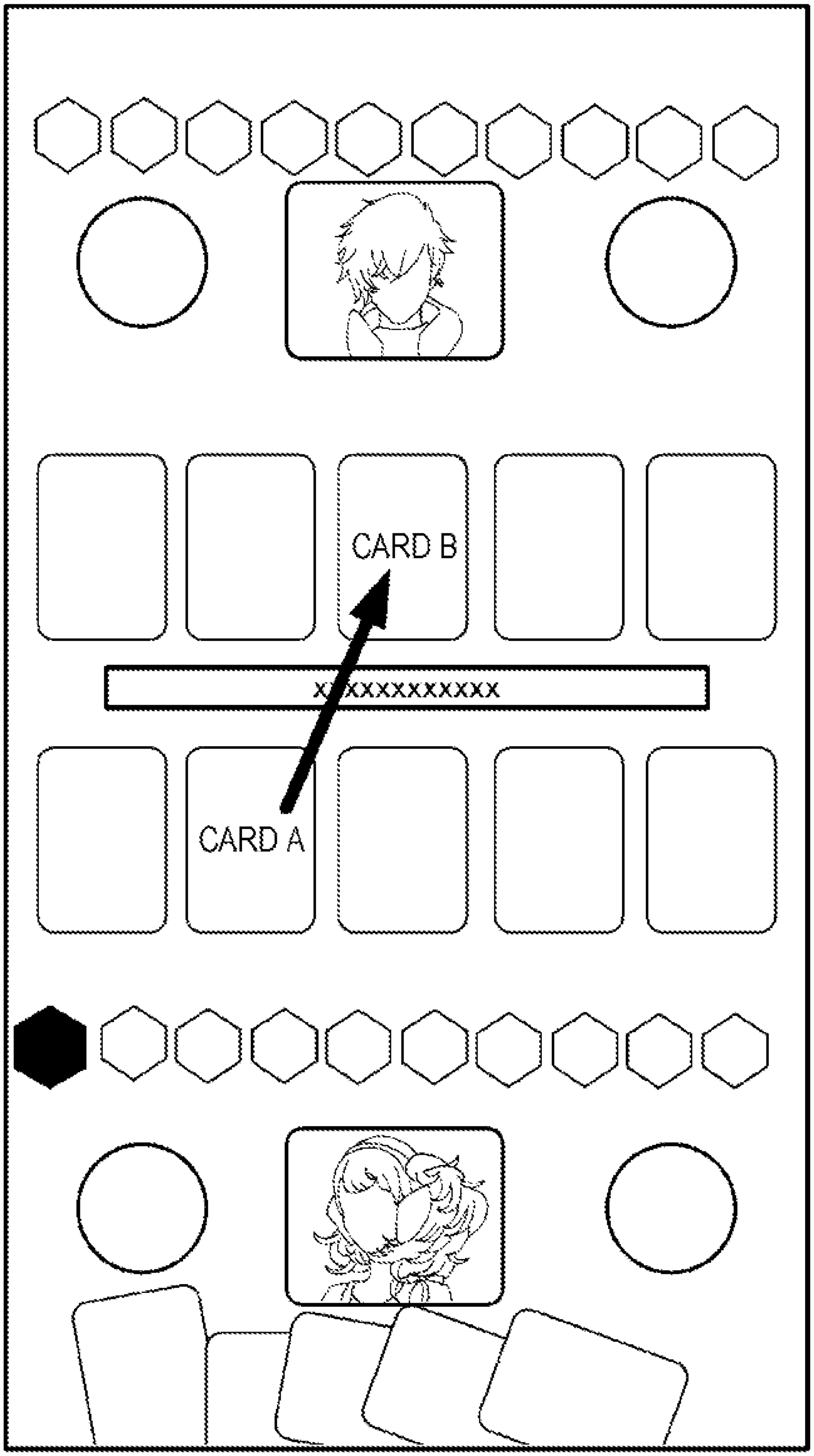
FIG. 16 illustrates a process of an operation image display unit.

The operation image display unit 73 performs a process for displaying an image used for operating a selection or action of a card. For example, if an input operation performed by the player is a card operation for "attacking opponent's card B with card A", for example, the operation image display unit 73 displays an image of an arrow extending from the card A to the opponent's card B, as shown in FIG. 16. For example, if a premium card is used in an attack, the operation image display unit 73 outputs the second expression mode data (including moving image data and sound data) in the card setting data of the premium card used.

The game manager 74 manages the progress of the entire game.

The image generator 62 generates a single game screen in a single frame time (e.g., 1/60 seconds) based on a processing result of the game arithmetic unit 61, and outputs an image signal of the generated game screen to the image display unit 53. The function of the image generator 62 is realized by, for example, a processor, such as a GPU or a digital signal processor (DSP), a video signal IC, a program, such as a video codec, a rendering-frame IC memory, such as a frame buffer, and an IC memory used for decompressing texture data.

The sound generator 63 generates sound information of an effect sound, background music (BGM), and operation assist information related to the game as well as sound signals of various types of operation sounds based on a processing result of the game arithmetic unit 61, and outputs the sound information and the sound signals to the sound output unit 54. The function of the sound generator 63 can be realized by, for example, a processor, such as a digital signal processor (DSP) or a voice synthesis IC, and an audio codec that can reproduce an audio file.

The communication controller 64 performs a data communication process with the game server 2 and also performs data processing.

The image display unit 53 displays various types of game screens based on image signals input from the image generator 62. The function of the image display unit 53 can be realized by, for example, a display device, such as a flat panel display, a cathode-ray tube (CRT), a projector, or a head-mounted display. In FIG. 2, the image generator 62 corresponds to the display 11.

The sound output unit 54 outputs a sound, such as a game-related voice or effect sound, based on a sound signal input from the sound generator 63. In FIG. 2, the sound output unit 54 corresponds to the loudspeakers 13.

The communication unit 55 connects with the communication line N to realize communication. The function of the communication unit 55 can be realized by, for example, a wireless communication device, a modem, a terminal adapter (TA), a wired communication cable jack, a control circuit, and so on.

Figure 17:
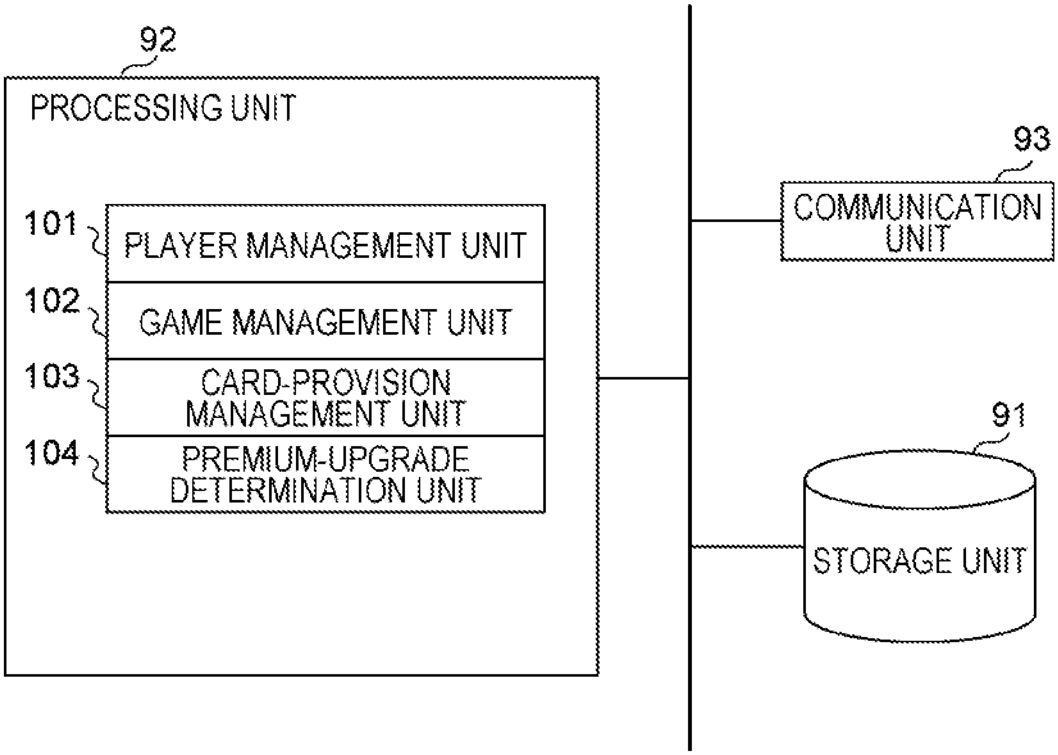
FIG. 17 illustrates a functional configuration example of a game server.

Next, the configuration of the game server 2 will be described. FIG. 17 is a block diagram illustrating a functional configuration example of the game server 2.

The game server 2 includes a storage unit 91, a processing unit 92, and a communication unit 93.

The storage unit 91 has stored therein a system program and a gaming program. The system program is for realizing a basic function of the game server 2 as a computer. The gaming program is for causing the processing unit 92 to function as a player management unit 101, a game management unit 102, a card-provision management unit 103, and a premium-upgrade determination unit 104.

Furthermore, the storage unit 91 has stored therein user information data, required-number-for-premium-upgrade data, and card data. The user information data is basic data of each player participating in the game and has recorded therein user information data of each player. FIG. 18 illustrates an example of the user information data. In the example in FIG. 18, the user information data contains user identification information of a player, deck setting data, owned card information, owned item information, and balance information (i.e., the balance of game currency or points). The user information data shown in FIG. 18 is an example and is not limited to this example.

The required-number-for-premium-upgrade data indicates the number of consumption targets required for premium-upgrading a card with respect to each consumption target (card or item). In this embodiment, the number of consumption targets required for premium-upgrading a card is set for each card rarity level. The number of consumption targets required for premium-upgrading a card may increase with increasing card rarity level. FIG. 19 illustrates an example of the required-number-for-premium-upgrade data. The required-number-for-premium-upgrade data shown in FIG. 19 is an example and is not limited to this example. Furthermore, the number of consumption targets required for premium-upgrading a card is not limited to each card rarity level and may be set based on another card attribute. Moreover, the number of consumption targets required for premium-upgrading a card may be set for each card type.

The card data contains card data of all the cards used in the game. Basically, data similar to the aforementioned card setting data in FIG. 10 is stored for all the cards used in the game.

The storage unit 91 includes the player management unit 101, the game management unit 102, the card-provision management unit 103, and the premium-upgrade determination unit 104.

The player management unit 101 uses the user information data to manage, for example, the account and the game progress for each connected player terminal 1.

The game management unit 102 receives, for example, the card setting information and the action selection information from each player terminal 1, performs a battle process by using the card setting information, the action selection information, and the card data, and outputs a battle result.

In response to a card provision request from a player terminal 1, the card-provision management unit 103 reads card information from the communication unit 93 and transmits the card information to the player terminal 1. If a card purchase request is received from a player terminal 1, the card-provision management unit 103 reads data corresponding to the card setting data from the communication unit 93 after a fee payment is confirmed, and transmits the data to the player terminal 1. Moreover, information about each card acquired by each player is supplied to the player management unit 101. The fee payment may be carried out by subtracting the fee from the balance (i.e., the balance of game currency or points) in the user information stored in the storage unit, or by another payment method.

In response to a determination request from a player terminal 1, the premium-upgrade determination unit 104 acquires a card rarity level selected by the corresponding player from card data (having a configuration similar to that of the card setting data in FIG. 10) in the storage unit 91, and acquires the required number of consumption targets corresponding to the acquired rarity level and selected by the player from the required-number-for-premium-upgrade data (FIG. 19) in the storage unit 91. Furthermore, the premium-upgrade determination unit 104 acquires the number of selected owned consumption targets from the user information data (FIG. 18) in the storage unit 91. Then, the premium-upgrade determination unit 104 compares the acquired required number of consumption targets with the acquired number of owned consumption targets to determine whether or not the number of consumption targets owned by the user is sufficient, and transmits the determination result to the player terminal 1. In addition to the information indicating whether the number of owned consumption targets is sufficient or insufficient, the determination result contains information about the required number and the number of owned consumption targets used for the determination.

Furthermore, when the premium-upgrade determination unit 104 receives, from the player terminal 1, a completion notification including information about a generated premium card and information about consumption targets, the premium-upgrade determination unit 104 updates the user information data with the received information.

The communication unit 93 connects with the communication line N to realize communication.

Operation of Each Device

The operation of each player terminal 1 will now be described.

Figure 20:
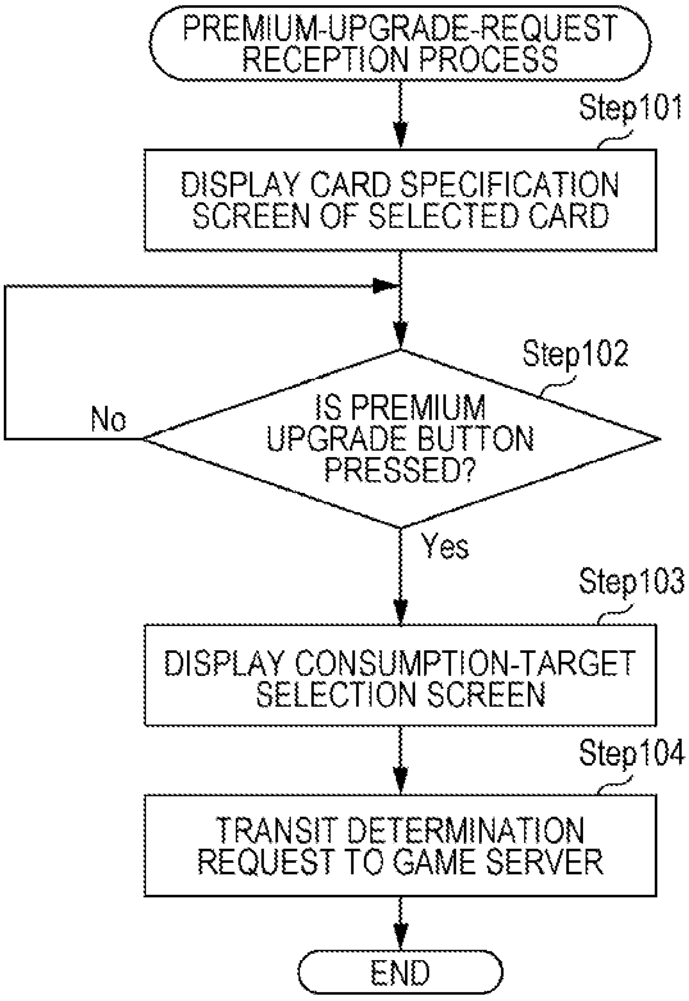
FIG. 20 is a flowchart illustrating a premium-upgrade-request reception process.

First, a premium-upgrade-request reception process for receiving a request for premium-upgrading a card will be described with reference to FIG. 20.

For example, after logging into the player terminal 1 by using a user ID "1001", the player selects an "edit deck" option from a menu screen. The player terminal 1 displays a deck editing screen by using the card setting data and the deck setting data corresponding to the user ID "1001". The player performs an input operation for selecting a card to be premium-upgraded from among cards owned by the player and displayed on the deck editing screen. When the card to be premium-upgraded is selected, the premium-upgrade-request reception process commences.

In response to the input operation for selecting the card, the player terminal 1 uses the card setting data corresponding to the selected card to display a card specification screen in step 101. For example, if a card of a character "AAA" (card identification information "001") is selected, the player terminal 1 uses the card setting data (FIG. 10) of the selected card of the character "AAA" to display the card specification screen (FIG. 12).

When the premium upgrade button on the card specification screen is pressed (YES in step 102), the player terminal 1 displays the consumption-target selection screen (FIG. 13) in step 103. The player selects the "card" option as a consumption target on the displayed consumption-target selection screen.

In response to the input operation for selecting the consumption target on the consumption-target selection screen, the player terminal 1 transmits, to the game server 2, information containing information (card identification "001") about the card selected as a target to be premium-upgraded, the selected consumption target "card", and the user ID "1001" together with a determination request in step 104.

The description of the premium-upgrade-request reception process ends here.

Figure 21:
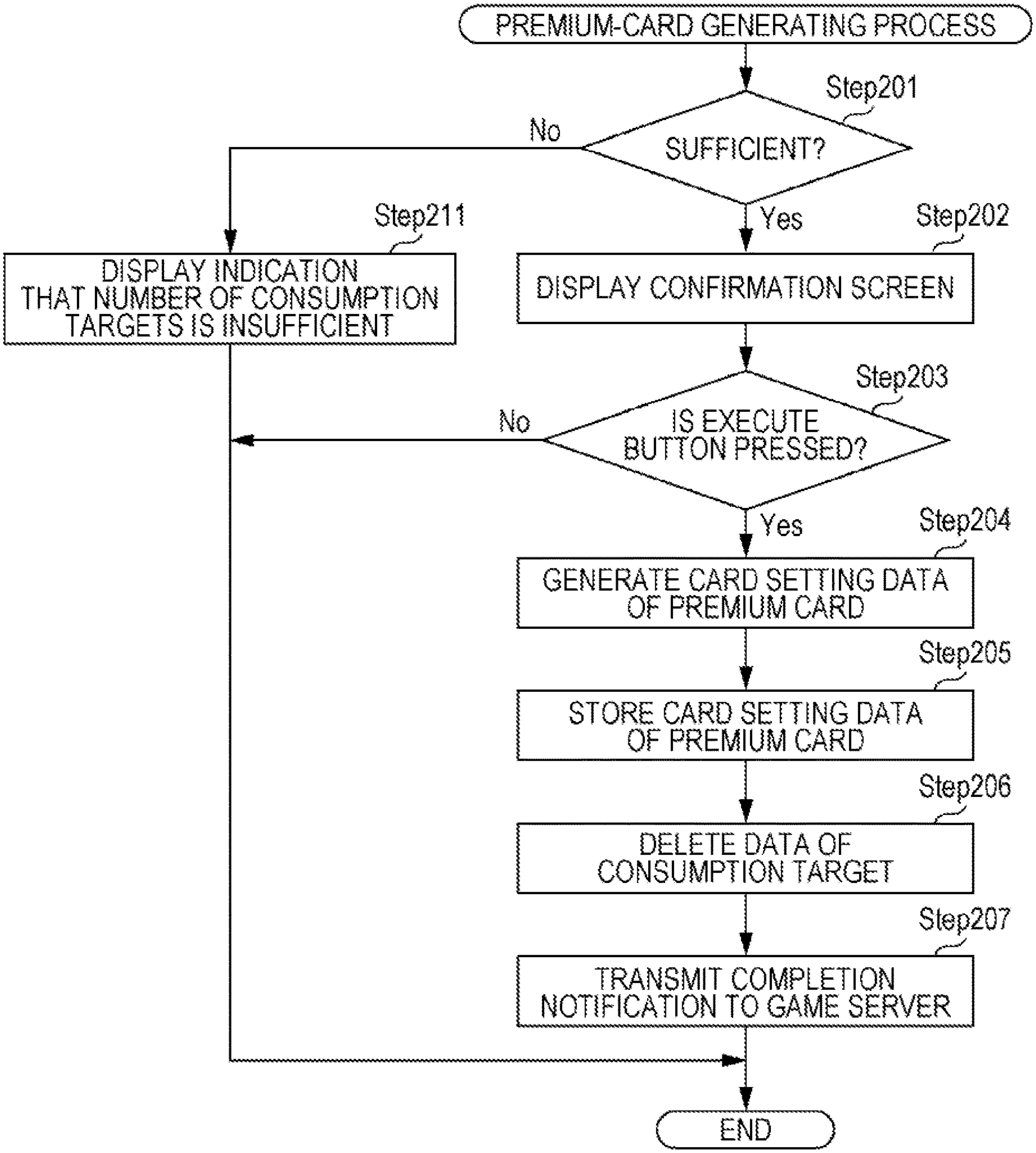
FIG. 21 is a flowchart illustrating a premium-card generating process.

Next, a premium-card generating process for generating a premium card based on a determination result received by the player terminal 1 from the game server 2 will be described with reference to FIG. 21.

The player terminal 1 receives, from the game server 2, the determination result with respect to the card identification information "001" and the card of the character "AAA". When this determination result is received, the premium-card generating process commences.

In step 201, the player terminal 1 assesses the determination result received from the game server 2. If the determination result indicates that the number of owned consumption targets is sufficient (YES in step 201), the player terminal 1 displays, in step 202, the confirmation screen (FIG. 14A) indicating that the number of owned consumption targets is sufficient and also including the premium-upgrade execute button.

When the execute button in the confirmation screen is pressed (YES in step 203), the player terminal 1 generates card setting data of a premium card in step 204. For example, as shown in FIG. 15, card setting data of the premium card is newly generated by using the card setting data of the card identification information "001" stored in the storage unit 51. A new set value "p001" of the premium card is set in the "card identification information", "yes" is set as a set value for "premium-upgraded", and a file name "pa001.xxx" of, for example, moving image data corresponding to the character "AAA" is acquired from the storage unit 51 and is set as the "second expression mode data". Furthermore, in data items other than the "card identification information" item, the "premium-upgraded" item, and the "second expression mode data" item, set values in the card setting data of the original card identification information "001" are set. In step 205, the player terminal 1 stores the card setting data of the generated premium card in the storage unit 51.

Subsequently, in step 206, the player terminal 1 deletes the data of the consumption target "card" from the storage unit 51. Since the determination result from the game server 2 contains information about the required number of consumption targets for a premium upgrade, the card setting data deleted from the storage unit 51 equals in number to this required number. Since the required number is 15 in the example in FIG. 14, the player terminal 1 deletes 15 pieces of card setting data for paid cards with the character name "AAA" from the storage unit 51.

In step 207, the player terminal 1 transmits, to the game server 2, a completion notification containing information related to the generated premium card (i.e., all or some of the card setting data) and information related to the deleted consumption targets.

If the received determination result indicates that the number of consumption targets owned by the user is insufficient in step 201 (NO in step 201), a screen indicating that the number of owned consumption targets is insufficient is displayed in step 211. Furthermore, if the cancel button is pressed instead of the execute button in step 203 (NO in step 203), the process ends.

The description of the premium-card generating process ends here.

Figure 22:
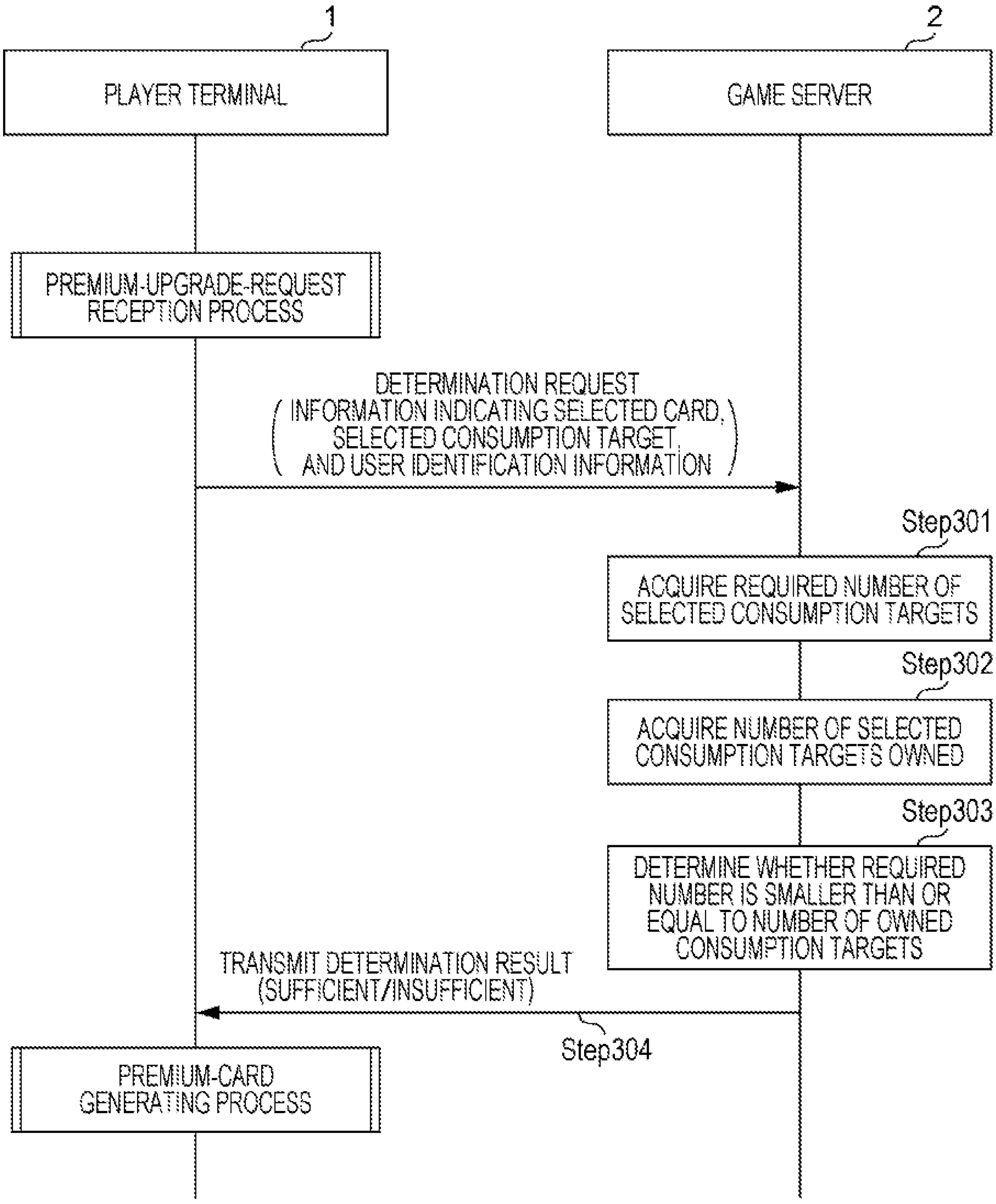
FIG. 22 is a flowchart illustrating a sufficient/insufficient determination process.

Next, a consumption-target sufficient/insufficient determination process performed by the game server 2 will be described with reference to FIG. 22.

As a result of a premium-upgrade-request reception process (FIG. 20) performed in one of the player terminals 1, information indicating information about a card selected as a target to be premium-upgraded, a selected consumption target, and user identification information is transmitted together with a determination request to the game server 2. When the game server 2 receives this determination request, the sufficient/insufficient determination process commences.

For example, when the game server 2 receives, from the player terminal 1, information including card identification information "001", consumption targets "cards", and user identification information "1001" together with a determination request, the game server 2 acquires a rarity level "2" of the selected card (i.e., card identification information "001") from the card data in the storage unit 91, and acquires a required number "15" of selected consumption targets "cards" corresponding to the acquired rarity level from the required-number-for-premium-upgrade data (FIG. 19) in the storage unit 91 in step 301.

Furthermore, in step 302, the game server 2 acquires the number of owned consumption targets "cards" from the user information data stored in the storage unit 91 and corresponding to the received user identification information "1001". In the case where the consumption targets are "cards", cards identical to or of the same type as the selected card are to be consumed. Thus, the game server 2 may acquire a character name corresponding to card identification information set in the owned card information in the user information data in the storage unit 91 from the card data in the storage unit 91, check the character name against the character name "AAA" corresponding to the card identification information "001", and count the number of matching cards.

In step 303, the game server 2 determines whether the acquired required number is smaller than or equal to the acquired number of owned consumption targets. In step 304, if the acquired required number is smaller than or equal to the acquired number of owned consumption targets, the game server 2 transmits a determination result indicating that the number of owned consumption targets is sufficient to the player terminal 1, whereas if the acquired required number is larger than the acquired number of owned consumption targets, the game server 2 transmits a determination result indicating that the number of owned consumption targets is insufficient to the player terminal 1. In a case where the number of cards of the character name "AAA" owned by the user with the user identification information "1001" is "15", the game server 2 transmits, to the player terminal 1, information indicating that the consumption targets are sufficient, the required number of cards is "15", and the number of owned cards is "15" as a determination result.

The description of the consumption-target sufficient/insufficient determination process ends here.

As described above, in this embodiment, a first game element (card) owned by players is used to convert the expression mode thereof from the first expression mode to the second expression mode, so that a highly-entertaining game can be provided to users. Furthermore, based on a condition in which first game elements (cards) that are identical or of the same type are to be consumed, the expression mode of each first game element (card) associated with a player is converted from the first expression mode to the second expression mode, so that cards redundantly acquired by the player are consumed, and in exchange, a card (premium card) whose expression mode has been converted from the first expression mode to the second expression mode can be provided to the player.

Modifications

The number of premium-upgradable cards may be limited to a predetermined value or smaller. For example, the number of premium-upgradable cards may be smaller than or equal to the number of cards forming a deck (i.e., 40 cards). Furthermore, if the number of cards included in a deck is set for each card type, the set number of cards or smaller may be premium-upgradable for each card type. For example, it is assumed that a player selects a card of the "character: AAA" as a card to be premium-upgraded from among cards displayed in the owned card region 31 on the deck editing screen. In this case, with respect to the selected card "character: AAA", the card setter 71 counts the number of already premium-upgraded cards with "AAA" set as a character name and "yes" set as a set value for "premium-upgraded" from the card setting data in the storage unit 51 and determines whether or not the count value is smaller than or equal to a limit value (e.g., 40 or smaller) so as to determine whether or not the card of the "character: AAA" is premium-upgradable. If the card is not premium-upgradable, the card setter 71 may display a message indicating that the premium upgrade is not possible on the screen without displaying the confirmation screen.

Premium-upgradable cards may be limited to cards of specific characters. For example, data of a list of specific characters is stored in the storage unit 51. For example, it is assumed that a player selects a card to be premium-upgraded from among cards displayed in the owned card region 31 on the deck editing screen. In this case, the card setter 71 refers to the list of specific characters in the storage unit 51 and determines whether the character of the selected card exists in the list so as to determine whether or not the card is premium-upgradable. If the card is not premium-upgradable, the card setter 71 may display a message indicating that the premium upgrade is not possible on the screen without displaying the confirmation screen.

Furthermore, although either a card or an item is selected as a consumption target on the consumption-target selection screen, the consumption target is not limited to this. For example, an owned card may be premium-upgraded in accordance with a payment of a predetermined fee (e.g., game currency or points) as a condition. Alternatively, the condition may be a payment of a predetermined fee within a predetermined period.

Furthermore, a card having a function similar to that of a premium card (i.e., a card having second expression mode data set therein and in which a rendering is executed in accordance with the second expression mode when the card is in use) may be provided when a predetermined condition is satisfied. The predetermined condition may be a payment of a predetermined fee or a payment of a predetermined fee within a predetermined period. Moreover, the aforementioned card may be provided limitedly with respect to a specific character.

As an alternative to the above embodiment in which the second expression mode data of a premium card corresponding to a card owned by a player is retained in the corresponding player terminal 1, the second expression mode data may be retained in the game server 2. Then, when required at the player terminal 1 (such as when a premium card is to be generated), the second expression mode data may be acquired from the game server 2 by requesting it therefrom.

A paid card is not limited to a card that is provided when a payment is made using money or game currency. For example, a card provided as a result of being exchanged with points acquired for free may be included as a paid card.

As an alternative to the above embodiment in which the card setting data of a card to be provided to a player and the second expression mode data of a premium card are received during a card providing process, the card setting data of all the cards to be used in the game (including cards not provided to the player) and the second expression mode data of the premium card may be received by the corresponding player terminal 1 from the game server 2 and be stored in the storage unit 51 in advance (such as when the gaming program is downloaded). In this case, during a card providing process, the player terminal 1 may receive the card identification information of each card to be provided from the server and may set card setting data information corresponding to the received card identification information by reading the card setting data information from the storage unit 51.

The output of the second expression mode data of a premium card is not limited to when the premium card is used. For example, the second expression mode data may be output when a player selects a premium card on a card displaying screen, such as during a premium-card generating process. As another alternative, the second expression mode data may be outputtable in various situations in which a premium card is involved.

In the competition game to which this gaming system is applied, for example, the player A and a non-player character A may form one team, the player B and a non-player character B may form one team, and the player A team and the player B team may compete against each other by using the first game elements (i.e., cards). Each non-player character may be obtainable by the corresponding player within the game. The battle may be executed between the player A team and the player B team, as an opponent, alternately taking turns. In each team, the player and the non-player character may alternately take turns. Furthermore, in a state where each player can select a first game element or determine an action thereof in the game, an artificial intelligence (AI) function may be used to allow a non-player character of the same team to provide advice information to the player for a favorable progression of the game.

Furthermore, the above embodiment is partially or entirely describable as in the following additional items, but is not limited thereto.

Additional Item 1

A terminal in which a game is performed by using a first game element includes a memory storing an execution command, and also includes a processor.

In accordance with the execution command, the processor executes a selecting process and an output control process. The selecting process involves selecting the first game element associated with a player. The first game element is converted from a first expression mode to a second expression mode when a predetermined condition is satisfied. The output control process involves outputting the selected first game element in accordance with the second expression mode.

Additional Item 2

A gaming system that performs a game using a first game element associated with a first player and a first game element associated with a second player serving as an opponent includes a terminal and a game management device.

The terminal includes a memory storing an execution command, and also includes a processor.

In accordance with the execution command, the processor executes a selecting process and an output control process. The selecting process involves selecting the first game element associated with the first player or the second player. The first game element is converted from a first expression mode to a second expression mode when a predetermined condition is satisfied. The output control process involves outputting the selected first game element in accordance with the second expression mode.

The game management device includes a memory storing an execution command, and also includes a processor.

In accordance with the execution command, the processor executes a determining process for determining a game element to be consumed for converting the expression mode of the first game element selected by the selecting means of the terminal.

Additional Item 3

A game management device communicable with a terminal of a first player and a terminal of a second player serving as an opponent for the first player includes a memory storing an execution command, and also includes a processor.

In accordance with the execution command, the processor executes a determining process for determining a game element to be consumed for converting an expression mode of a first game element selected in the terminal of the first player or the second player. The first game element is converted from a first expression mode to a second expression mode when a predetermined condition is satisfied.

Although the present invention has been described above with reference to a preferred embodiment, the present invention is not necessarily limited to the above embodiment, and may be variously modified within the technical scope of the invention.

The invention claimed is:

1. A program control apparatus, comprising at least one processor and at least one non-volatile computer readable medium comprising computer code, the at least one non-volatile memory and the computer code configured to, with the processor, cause a computer to execute a game using a first game element, the program control apparatus causing the computer to:

receive data selecting the first game element associated with a player from a terminal, wherein the data selecting the first game element identifies game element characteristics;

causing the program control apparatus to cause the computer to select a consumption target to be consumed as a part of satisfying a predetermined condition for changing an expression mode of a portion of the first game element from a first expression mode to a second expression mode, wherein the predetermined condition is identified at least in part by the game element characteristics identified in data stored within the non-volatile memory;

upon determining that the predetermined condition is satisfied:

consuming the consumption target; and causing the terminal to convert the first game element from the first expression mode to the second expression mode based at least in part on a portion of the game element characteristics stored locally at the terminal; and output the selected first game element in accordance with the second expression mode.

2. The program control apparatus according to claim 1, wherein the predetermined condition comprises consumption of an identical first game element or a first game element of an identical type associated with the player.

3. The program control apparatus according to claim 1, wherein the predetermined condition comprises at least one of consumption of a predetermined item and a payment of a predetermined fee.

4. The program control apparatus according to claim 1, wherein the program control apparatus causes the computer to further display the first game element associated with the player as an image.

5. The program control apparatus according to claim 1, wherein the output comprises outputting a screen indicating whether the selected consumption target is sufficient or insufficient.

6. The program control apparatus according to claim 1, wherein the first expression mode is a mode in which the first game element is expressed with a still image, and wherein the second expression mode is a mode in which at least a part of the first game element is expressed with a moving image.

7. The program control apparatus according to claim 1, wherein the first expression mode is a mode in which a character and a background of the character are expressed with a still image, and wherein the second expression mode is a mode in which at least one of the character and the background is expressed with a moving image.

8. The program control apparatus according to claim 1, wherein the second expression mode is a mode in which sound is added to an expression of the first game element.

9. The program control apparatus according to claim 1, wherein a rarity level is set for the first game element, and wherein the number of game elements consumed for converting the first expression mode of the first game element to the second expression mode is set in accordance with the rarity level of the first game element.

10. The program control apparatus according to claim 1, wherein the number of game elements consumed for converting the first expression mode of the first game element to the second expression mode increases with increasing rarity level of the first game element.

11. The program control apparatus according to claim 1, wherein a parameter indicating an attribute of a character corresponding to the first game element to be used as the game progresses is set in the first game element, and wherein the parameter of the first game element converted from the first expression mode to the second expression mode is not changed.

12. The program control apparatus according to claim 1, wherein the program control apparatus causes the computer to further provide the first game element to the player, and wherein the first game element provided comprises a first game sub-element provided in accordance with a payment of a fee as a condition and a second game sub-element provided without requiring the payment of the fee as a condition, and wherein the first game sub-element provided without requiring the payment of the fee as a condition is not counted as a game element consumed for converting the first expression mode of the first game element to the second expression mode.

13. The program control apparatus according to claim 1, wherein the game using the first game element is a game in which the player competes with an opponent player by using a predetermined number of first game elements associated with the player, and wherein the number of first game elements to be converted from the first expression mode to the second expression mode is equal to or lower than the predetermined number.

14. The program control apparatus according to claim 1, wherein the output comprises allowing the first game element to be outputtable in accordance with the second expression mode if a character corresponding to the first game element is a specific character.

15. The program control apparatus according to claim 1, wherein the output comprises allowing the first game element to be outputtable in accordance with the second expression mode if a fee is paid within a predetermined period.

16. A terminal in which a game is performed by using a first game element, the terminal configured for providing:

a selector user interface for selecting the first game element associated with a player, wherein the first game element is stored locally on a memory storage device of the terminal together with first game element characteristics;

a graphical display for converting the first game element from a first expression mode to a second expression mode based at least in part on user input received via the selector user interface selecting at least one additional game element as a consumption target to be consumed as a part of satisfying a predetermined condition for changing an expression mode of the first game element from the first expression mode to the second expression mode; and an output controller to output the selected first game element via the graphical display in accordance with the second expression mode.

17. A gaming system that performs a game using a first game element associated with a first player and a first game element associated with a second player serving as an opponent, the gaming system comprising:

a terminal; and a game management device, wherein the terminal is configured for providing:

a selector user interface for:

selecting the first game element associated with the first player or the second player, wherein the first game element is stored locally on a memory storage device of the terminal together with first game element characteristics;

selecting at least one additional game element as a consumption target to be consumed as a part of satisfying a predetermined condition for changing an expression mode of the first game element from a first expression mode to a second expression mode a graphical display for converting the first game element from a first expression mode to a second expression mode based at least in part on satisfaction of a predetermined condition, and an output controller to output the selected first game element via the graphical display in accordance with the second expression mode, and wherein the game management device comprises:

a controller to determine a game element to be a consumption target to be consumed as a part of satisfying the predetermined condition for converting the expression mode of the first game element selected by the selector user interface of the terminal from the first expression mode to the second expression mode.

18. A game management device communicable with a terminal of a first player and a terminal of a second player serving as an opponent for the first player, the game management device comprising:

a controller to determine a game element to be a consumption target to be consumed as a part of satisfying a predetermined condition for converting an expression mode of a first game element selected via a selection user interface of the terminal of the first player or the second player, the first game element being converted from a first expression mode to a second expression mode based at least in part on user input received via the selector user interface of the terminal and satisfying the predetermined condition.

* * * * *